United States Patent
Tsai et al.

(10) Patent No.: US 9,627,796 B2
(45) Date of Patent: Apr. 18, 2017

(54) WATERPROOF ELECTRICAL RECEPTACLE CONNECTOR

(71) Applicant: ADVANCED-CONNECTEK INC., New Taipei (TW)

(72) Inventors: Yu-Lun Tsai, New Taipei (TW); Pin-Yuan Hou, New Taipei (TW); Chung-Fu Liao, New Taipei (TW); Ya-Fen Kao, New Taipei (TW); Rui Su, New Taipei (TW); Long-Fei Chen, New Taipei (TW)

(73) Assignee: Advanced-Connectek Inc., New Taipei (TW)

( * ) Notice: Subject to any disclaimer, the term of this patent is extended or adjusted under 35 U.S.C. 154(b) by 0 days.

(21) Appl. No.: 14/966,263

(22) Filed: Dec. 11, 2015

(65) Prior Publication Data
US 2016/0181722 A1    Jun. 23, 2016

(30) Foreign Application Priority Data
Dec. 19, 2014  (CN) .......................... 2014 1 0792467

(51) Int. Cl.
*H01R 13/40*   (2006.01)
*H01R 13/52*   (2006.01)
*H01R 24/60*   (2011.01)
*H01R 107/00*  (2006.01)

(52) U.S. Cl.
CPC ..... *H01R 13/5202* (2013.01); *H01R 13/5216* (2013.01); *H01R 24/60* (2013.01); *H01R 2107/00* (2013.01)

(58) Field of Classification Search
CPC ................................................... H01R 13/5202
USPC ........................................ 439/587, 548, 589
See application file for complete search history.

(56) References Cited

U.S. PATENT DOCUMENTS

| | | | | |
|---|---|---|---|---|
| 7,922,535 | B1 * | 4/2011 | Jiang .................. | H01R 13/5205 439/271 |
| 8,025,530 | B2 * | 9/2011 | Abramov ........... | H01R 13/5202 439/587 |
| 8,052,467 | B1 * | 11/2011 | Xie ..................... | H01R 13/5219 439/589 |
| 8,348,688 | B2 * | 1/2013 | Liu ..................... | H01R 13/5219 439/271 |

(Continued)

*Primary Examiner* — Tulsidas C Patel
*Assistant Examiner* — Peter G Leigh
(74) *Attorney, Agent, or Firm* — Muncy, Geissler, Olds & Lowe, P.C.

(57) ABSTRACT

A waterproof electrical receptacle connector includes an insulated housing, a metallic shell, and a sealing member (e.g., a waterproof glue block). The insulated housing includes a base portion and a tongue portion extended from one side of the base portion. The metallic shell includes a tubular portion and an outer peripheral portion. The outer peripheral portion is formed by deep drawing techniques and extended from the rear of the tubular portion. The inner dimension of the outer peripheral portion is greater than the inner dimension of the tubular portion. A filling groove is forming between the inner wall of the outer peripheral portion and the outer surface of the base portion. The sealing member is formed at the filling groove to fill a gap between the inner wall of the outer peripheral portion and the outer surface of the base portion and fill the bottom of the base portion.

11 Claims, 11 Drawing Sheets

(56) References Cited

U.S. PATENT DOCUMENTS

| | | | |
|---|---|---|---|
| 8,388,380 B1* | 3/2013 | Van der Steen | H01R 13/5202 |
| | | | 439/607.36 |
| 8,827,742 B2* | 9/2014 | Wang | H01R 24/68 |
| | | | 439/569 |
| 9,112,299 B2* | 8/2015 | Lu | H01R 13/5227 |
| 9,130,301 B2* | 9/2015 | Lu | H01R 13/521 |
| 9,385,484 B2* | 7/2016 | Chen | H01R 13/6582 |
| 2005/0221672 A1* | 10/2005 | Tsuchjya | H01R 13/4223 |
| | | | 439/587 |
| 2012/0108095 A1* | 5/2012 | Liu | H01R 13/5219 |
| | | | 439/271 |
| 2012/0315779 A1* | 12/2012 | Yudate | H01R 12/724 |
| | | | 439/271 |
| 2013/0183844 A1* | 7/2013 | Wang | H01R 24/68 |
| | | | 439/271 |
| 2013/0344739 A1* | 12/2013 | Shih | H01R 13/658 |
| | | | 439/607.28 |
| 2014/0113497 A1* | 4/2014 | Wang | H01R 13/52 |
| | | | 439/660 |
| 2014/0187094 A1* | 7/2014 | Zhao | H01R 13/6581 |
| | | | 439/626 |
| 2014/0187105 A1* | 7/2014 | Zhao | H01R 12/707 |
| | | | 439/733.1 |
| 2016/0149337 A1* | 5/2016 | Ozaki | H01R 13/73 |
| | | | 439/529 |

* cited by examiner

| GND | TX1+ | TX1− | VBUS | CC1 | D+ | D− | RFU | VBUS | RX2− | RX2+ | GND | } 2 |
|---|---|---|---|---|---|---|---|---|---|---|---|---|
| GND | RX1+ | RX1− | VBUS | RFU | D− | D+ | CC2 | VBUS | TX2− | TX2+ | GND | } 3 |

WATERPROOF ELECTRICAL RECEPTACLE CONNECTOR

CROSS-REFERENCES TO RELATED APPLICATIONS

This non-provisional application claims priority under 35 U.S.C. §119(a) on Patent Application No. 201410792467.4 filed in China, P.R.C. on 2014 Dec. 19, the entire contents of which are hereby incorporated by reference.

FIELD OF THE INVENTION

The instant disclosure relates to an electrical receptacle connector, and more particular to a waterproof electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing.

Specifically, an existing USB type-C electrical receptacle connector includes an insulated housing, a plurality of first terminals, a plurality of second terminals, and a hollowed shell. The insulated housing includes a base portion and a tongue portion extended from one side of the base portion. The first terminals are held in the base portion and the tongue portion. The front of each of the first terminals is disposed at an upper surface of the tongue portion, and the rear of each of the first terminals is protruded from the base portion for connecting with a circuit board. The second terminals are held in the base portion and the tongue portion. The front of each of the second terminals is disposed at a lower surface of the tongue portion, and the rear of each of the second terminals is protruded from the base portion for connecting with the circuit board. The hollowed shell encloses the insulated housing. However, the hollowed shell is devoid of a waterproof structure which can prevent water moist at the front of the hollowed shell from being penetrated into the rear of the hollowed shell. In other words, the rear of the hollowed shell lacks any sealing structure so that a gap may be formed between the rear of the insulated housing and any other member in the connector. Therefore, the water moist may enter into an electronic device assembled with the connector. That is, the circuit board inside the electronic device may get wet which may further lead the malfunction of the electronic device.

SUMMARY OF THE INVENTION

Consequently, how to improve the existing connector becomes an issue.

In view of this, an exemplary embodiment of the instant disclosure provides a waterproof electrical receptacle connector which can provide a waterproof function in an efficient manner and prevents water moist from entering into an electronic device assembled with the connector through the connector.

An exemplary embodiment of the waterproof electrical receptacle connector comprises an insulated housing, a plurality of first receptacle terminals, a plurality of second receptacle terminals, a metallic shell, and a sealing member (e.g., a waterproof glue block). The insulated housing comprises a base portion and a tongue portion extended from one side of the base portion. The tongue portion has an upper surface and a lower surface. The first receptacle terminals comprise a plurality of first signal terminals, at least one first power terminal, and at least one first ground terminal. Each of the first receptacle terminals is held in the insulated housing and disposed at the upper surface. The second receptacle terminals comprise a plurality of second signal terminals, at least one second power terminal, and at least one second ground terminal. Each of the second receptacle terminals is held in the insulated housing and disposed at the lower surface. One of two ends of each of the second receptacle terminals is disposed at the lower surface, and the other end of each of the second receptacle terminals is protruded from the bottom of the base portion. The metallic shell defines a receiving cavity. The insulated housing is disposed in the receiving cavity. The metallic shell comprises a tubular portion and an outer peripheral portion. The outer peripheral portion is formed by deep drawing techniques and extended from the rear of the tubular portion. An inner dimension of the outer peripheral portion is greater than an inner dimension of the tubular portion. A filling groove is formed between an inner wall of the outer peripheral portion and an outer surface of the base portion. The sealing member is formed at the filling groove to fill a gap between the inner wall of the outer peripheral portion and the outer surface of the base portion and to fill the bottom of the base portion.

Based on the above, the sealing member (e.g., the waterproof glue block) is formed at the filling groove between the inner wall of the outer peripheral portion of the metallic shell and the outer surface of the base portion, and the sealing member fills the gaps between the inner wall of the outer peripheral portion and the outer surface of the base portion and fills the bottom of the base portion. Accordingly, water moist can be prevented from being entering into the connector. In addition, since the metallic shell is seamless and has no cracks, water moist cannot enter into the connector easily.

Furthermore, the first receptacle terminals and the second receptacle terminals are arranged upside down, and the pin-assignment of the first flat contact portions of the first receptacle terminals is left-right reversal with respect to that of the second flat contact portions of the second receptacle terminals. Accordingly, the waterproof electrical receptacle connector can have a 180 degree symmetrical, dual or double orientation design and pin assignments which enables the waterproof electrical receptacle connector to be mated with a corresponding plug connector in either of two intuitive orientations, i.e. in either upside-up or upside-down directions. Therefore, when an electrical plug connector is inserted into the waterproof electrical receptacle connector with a first orientation, the first flat contact portions of the first receptacle terminals are in contact with upper-row plug terminals of the electrical plug connector. Conversely, when the electrical plug connector is inserted into the waterproof electrical receptacle connector with a second orientation, the second flat contact portions of the second receptacle terminals are in contact with the upper-row plug terminals of the electrical plug connector. Note that, the inserting orientation of the electrical plug connector is not limited by the instant disclosure.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
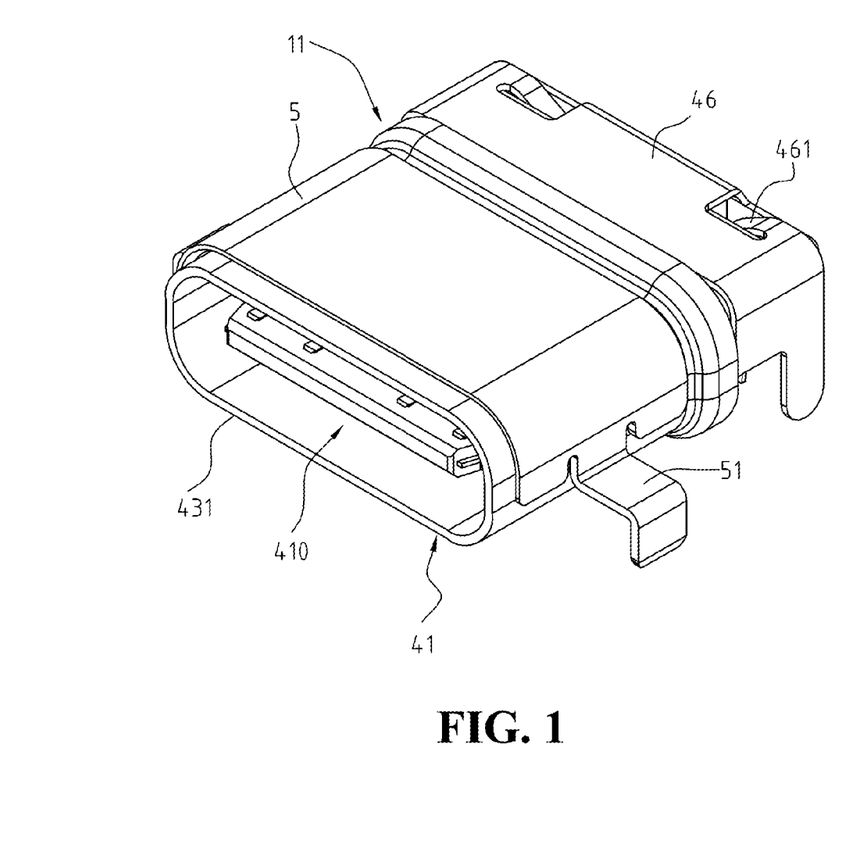
FIG. 1 illustrates a perspective view of a waterproof electrical receptacle connector according to an exemplary embodiment of the instant disclosure.
Figure 2:
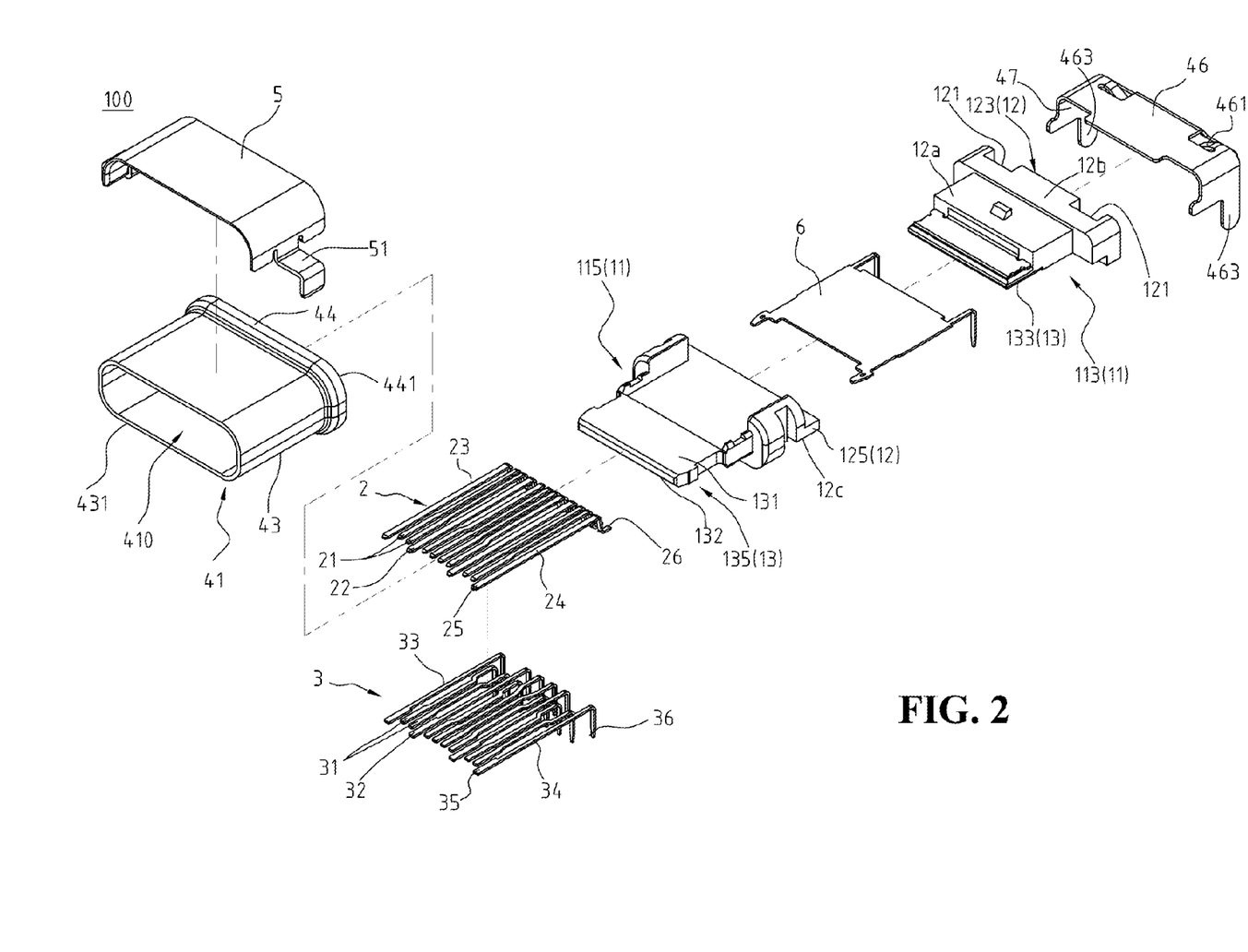
FIG. 2 illustrates an exploded view of the waterproof electrical receptacle connector.
Figure 3:
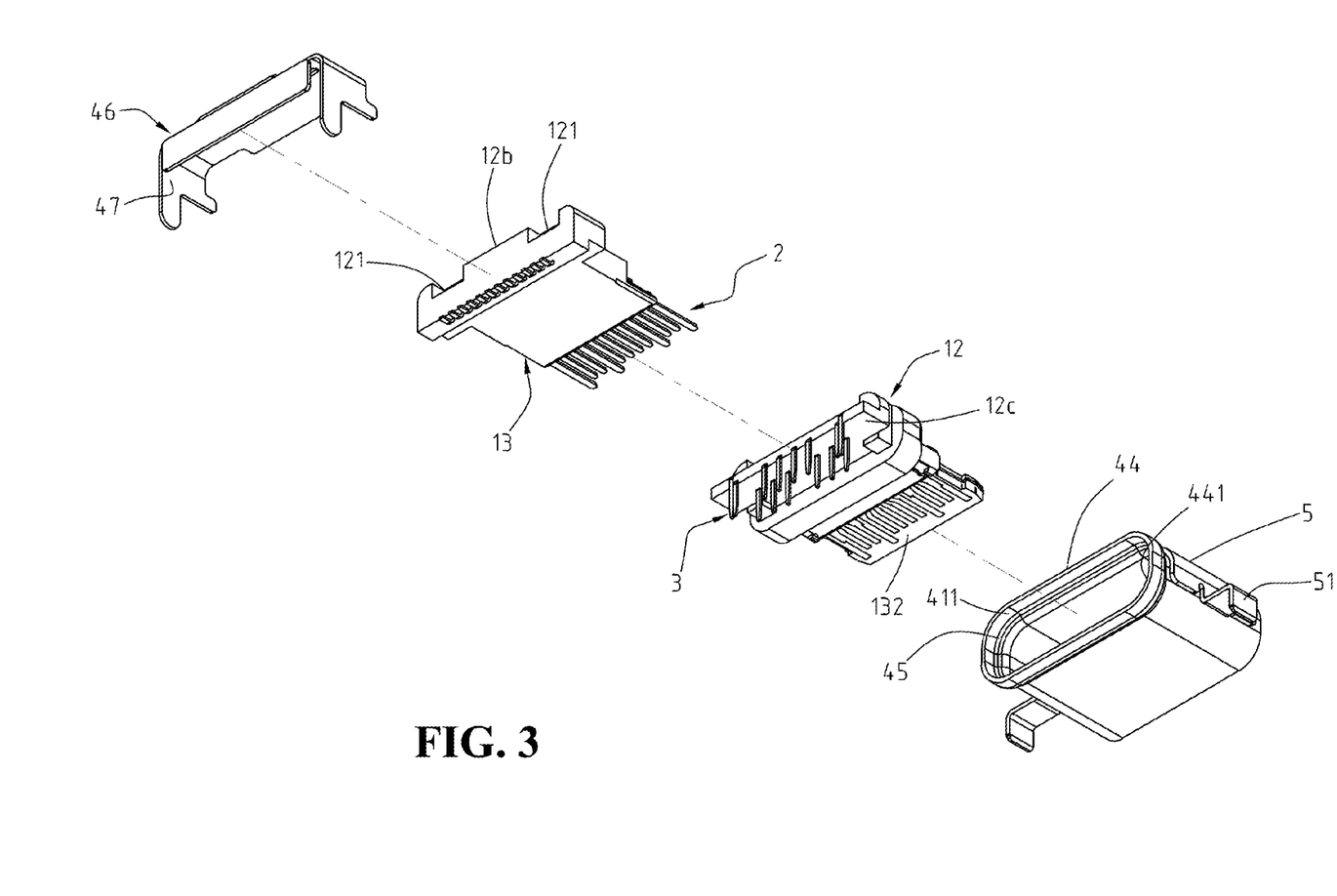
FIG. 3 illustrates an exploded view from the back of the waterproof electrical receptacle connector.

Please refer to FIG. 1 to FIG. 3, which illustrate a waterproof electrical receptacle connector 100 of a first embodiment according to the instant disclosure. FIG. 1 illustrates a perspective view of the waterproof electrical receptacle connector 100. FIG. 2 illustrates an exploded view of the waterproof electrical receptacle connector 100. FIG. 3 illustrates an exploded view from the back of the waterproof electrical receptacle connector 100. In this embodiment, the waterproof electrical receptacle connector 100 can provide a reversible or dual orientation USB Type-C connector interface and pin assignments, i.e., a USB Type-C receptacle connector. The connector can be utilized in mobile devices, laptop computers, digital cameras, or other electronic devices. In this embodiment, the waterproof electrical receptacle connector 100 comprises an insulated housing 11, a plurality of first receptacle terminals 2, a plurality of second receptacle terminals 3, a metallic shell 41, and a sealing member 7 (e.g., a waterproof glue block 71). In addition, the waterproof electrical receptacle connector 100 further comprises a grounding plate 6 disposed in the insulated housing 11 and located between the first receptacle terminals 2 and the second receptacle terminals 3. Specifically, the waterproof electrical receptacle connector 100 may have receptacle terminals aligned in one row. In other words, the waterproof electrical receptacle connector 100 may only have the first receptacle terminals 2 or the second receptacle terminals 3. In this embodiment, the waterproof electrical receptacle connector 100 comprises both the first receptacle terminals 2 and the second receptacle terminals 3, but embodiments are not limited thereto. The connector may have receptacle terminals aligned in one row according to practical requirements or cost issues.

Please refer to FIGS. 2 and 3. The insulated housing 11 is received in the metallic shell 41, and the insulated housing 11 is enclosed by the metallic shell 41. The insulated housing 11 comprises a base portion 12 and a tongue portion 13. The tongue portion 13 is extended from one side of the base portion 12. In this embodiment, the insulated housing 11 is formed by combining a first member with a second member. In other words, the assembly of the first member and the second member defines the base portion 12 and the tongue portion 13. In addition, the first member forms parts of the tongue portion 13 and the upper portion of the base portion 12, and the second member forms rest parts of the tongue portion 13 and the lower portion of the base portion 12, but embodiments are not limited thereto. In some embodiments, the base portion 12 and the tongue portion 13 may be formed integrally as a whole by injection molded or the like. In addition, the tongue portion 13 has an upper surface 131 and a lower surface 132 opposite to the upper surface 131.

The insulated housing can be a single piece, or consist of a plurality of pieces, for example, the insulated housing includes a upper insulated housing 113 and a lower insulated housing 115. Accordingly, the base portion 12 includes a upper base portion 123 and a lower base portion 125, and the tongue portion 13 includes a upper tongue portion 133 and a lower tongue portion 135.

Figure 4:
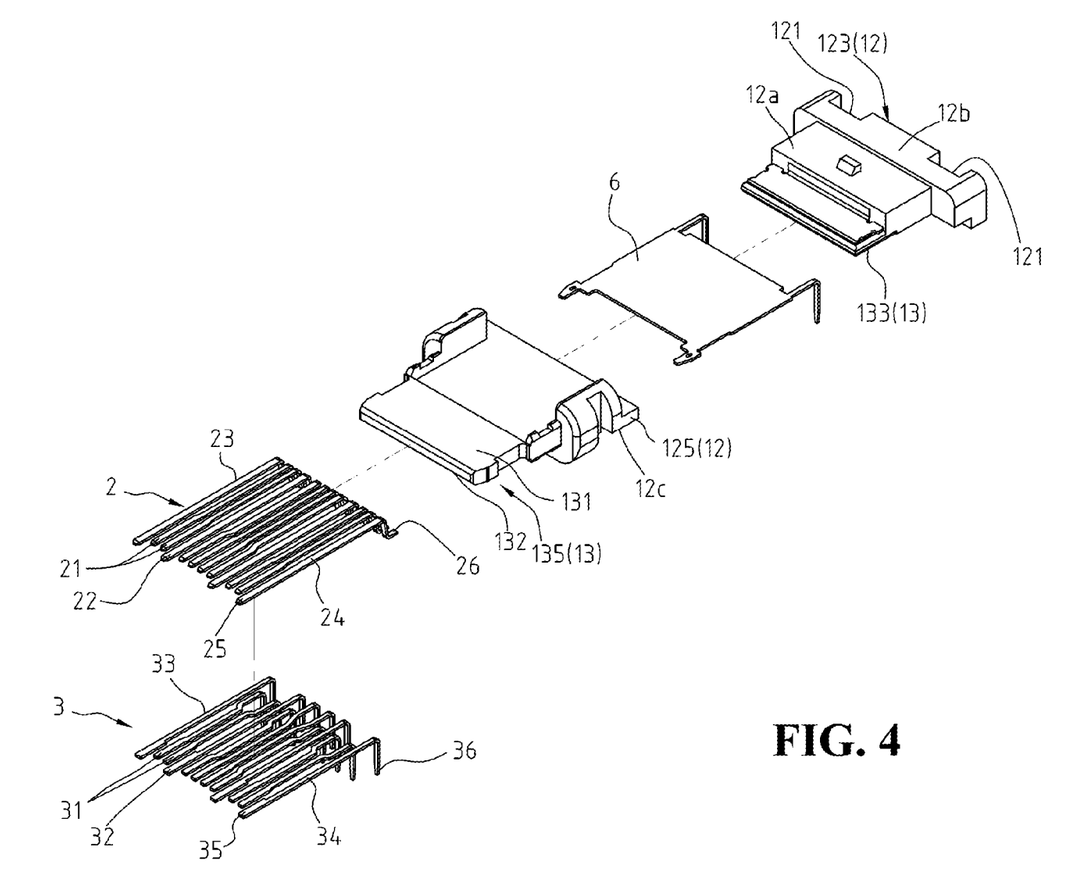
FIG. 4 illustrates an exploded view showing an insulated housing, a plurality of first receptacle terminals, and a plurality of second receptacle terminals of the waterproof electrical receptacle connector.
Figure 5:
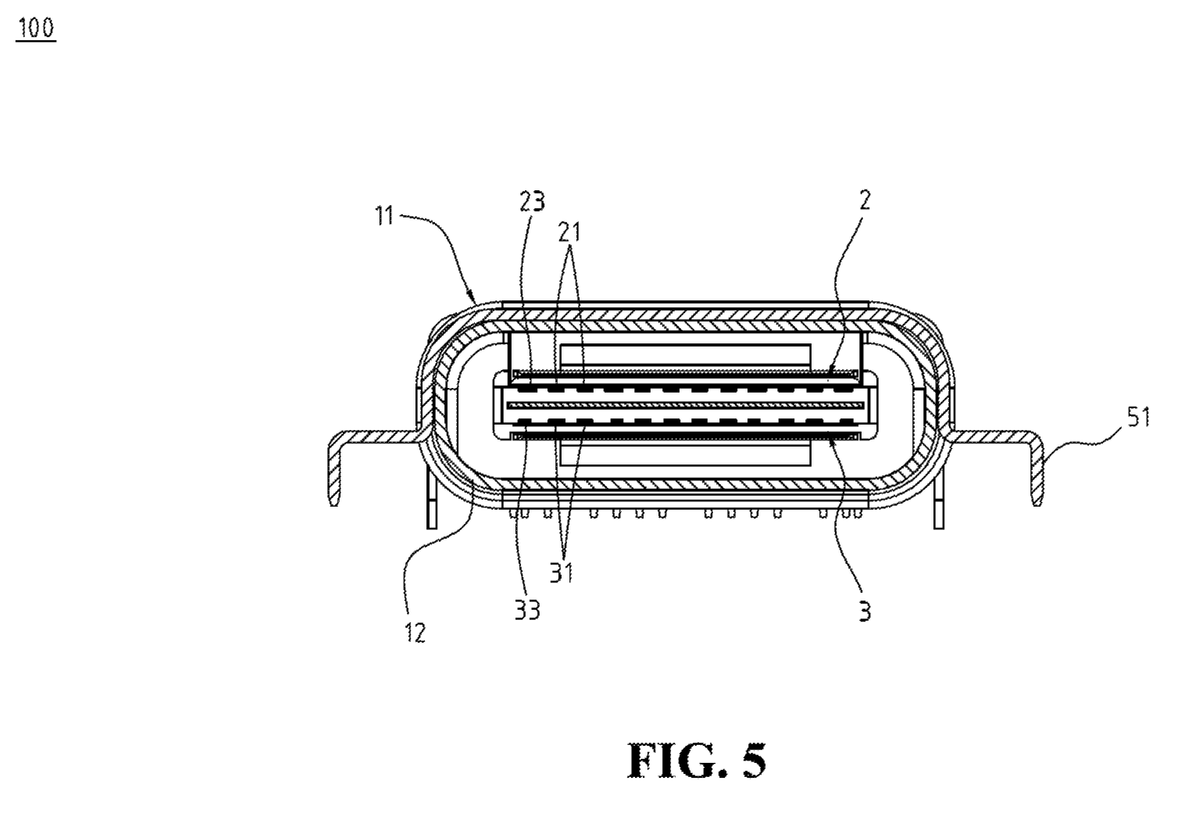
FIG. 5 illustrates a front sectional view of the waterproof electrical receptacle connector.
Figure 6:
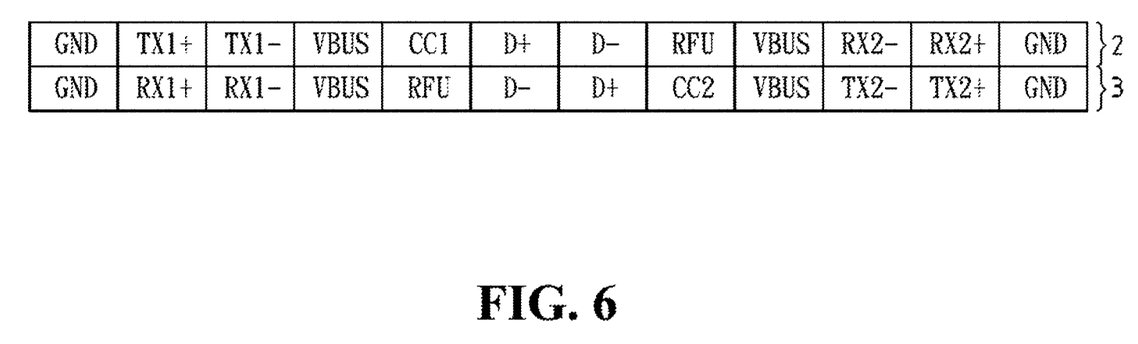
FIG. 6 illustrates a schematic configuration diagram of the receptacle terminals of the waterproof electrical receptacle connector shown in FIG. 5.

Please refer to FIGS. 4 to 6. The first receptacle terminals 2 are held in the base portion 12 and the tongue portion 13. Each of the first receptacle terminals 2 comprises a first flat contact portion 25, a first body portion 24, and a first tail portion 26. The first body portions 24 are held in the base portion 12 and disposed at the upper surface 131 of the tongue portion 13. Each of the first flat contact portions 25 is extended from one of two ends of the corresponding first body portion 24 and disposed at the upper surface 131 of the tongue portion 13, and each of the first tail portions 26 is extended from the other end of the corresponding first body portion 24 and exposed out of the base portion 12. The first receptacle terminals 2 are disposed at the upper surface 131 of the tongue portion 13 and provided for transmitting first signals (i.e., USB 3.0 signals). The first tail portions 26 are extended out of the bottom surface of the base portion 12. Furthermore, the first tail portions 26 are bent horizontally to form flat legs, named SMT (surface mounted technology) legs, which can be mounted or soldered on the surface of a printed circuit board (PCB) by using surface mount technology, as shown in FIG. 4.

Please refer to FIGS. 4 to 6. The second receptacle terminals 3 are held in the base portion 12 and the tongue portion 13. The second receptacle terminals 3 are spacedly aligned below the first receptacle terminals 2. Each of the second receptacle terminals 3 comprises a second contact portion 35, a second body portion 34, and a second tail portion 36. The second body portions 34 are held in the base portion 12 and disposed at the lower surface 132 of the tongue portion 13. Each of the second flat contact portions 35 is extended from one of two ends of the corresponding second body portion 34 and disposed at the lower surface 132 of the tongue portion 13, and each of the second tail portions 36 is extended from the other end of the corresponding second body portion 34 and exposed out of the base portion 12. The second receptacle terminals 3 are disposed at the lower surface 132 of the tongue portion 13 and provided for transmitting second signals (i.e., USB 3.0 signals). The second tail portions 36 are extended out of the bottom 12c of the base portion 12. In addition, the second tail portions 36 are extended downwardly to form vertical legs, named through-hole legs, that are inserted into holes drilled in a printed circuit board (PCB) by using through-hole technology, as shown in FIG. 4. In this embodiment, the first tail portions 26 and the second tail portions 36 are protruded out of the bottom 12c of the base portion 12 and arranged separately. For example, the first tail portions 26 and the second tail portions 36 may form three rows, the second tail portions 36 are at the front two rows, and the first tail portions 26 are at the rear row.

Please refer to FIGS. 4 to 6. In this embodiment, the first receptacle terminals 2 comprise a plurality of first signal terminals 21, at least one first power terminal 22, and at least one first ground terminal 23. As shown in FIG. 6, the first receptacle terminals 2 comprise, from left to right, a first ground terminal 23 (Gnd), a first pair of differential signal terminals (TX1+−), a second pair of differential signal terminals (D+−), and a third pair of differential signal terminals (RX2+−) of the first signal terminals 21, first power terminals 22 (Power/VBUS) between the three pairs of differential signal terminals, a retain terminal (RFU) and another first ground terminal 23 (Gnd). However, the pin assignments are not thus limited, and the example described here is only for illustrative purposes. In this embodiment, twelve first receptacle terminals 2 are provided for transmitting USB 3.0 signals, but embodiments are not limited thereto. In some embodiments, the rightmost first ground terminal 23 (or the leftmost first ground terminal 23) and the retain terminal are omitted. Furthermore, the rightmost first ground terminal 23 may be replaced by a first power terminal 22 and provided for power transmission.

Please refer to FIGS. 4 to 6. In this embodiment, the second receptacle terminals 3 comprise a plurality of second signal terminals 31, at least one second power terminal 32, and at least one second ground terminal 33. As shown in FIG. 6, the second receptacle terminals 3 comprise, from left to right, a second ground terminal 33 (Gnd), a first pair of differential signal terminals (TX2+−), a second pair of differential signal terminals (D+−), and a third pair of differential signal terminals (RX1+−) of the second signal terminals 31, second power terminals 32 (Power/VBUS) between the three pairs of differential signal terminals, a retain terminal (RFU) and another second ground terminal 33 (Gnd). However, the pin assignments are not thus limited, and the example described here is only for illustrative purposes. In this embodiment, twelve second receptacle terminals 3 are provided for transmitting USB 3.0 signals, but embodiments are not limited thereto. In some embodiments, the rightmost second ground terminal 33 (or the leftmost second ground terminal 33) and the retain terminal are omitted. Furthermore, the rightmost second ground terminal 33 may be replaced by a second power terminal 32 and provided for power transmission.

In the forgoing embodiments, the receptacle terminals 2, 3 are provided for transmitting USB 3.0 signals, but embodiments are not limited thereto. In some embodiments, for the first receptacle terminals 2 in accordance with transmission of USB 2.0 signals, the first and third pairs of differential signal terminals (TX1+−, RX2+−), are omitted, and the second pair of differential signal terminals (D+−) and the first power terminals (Power/VBUS) 22 are retained. While for the second receptacle terminals 3 in accordance with transmission of USB 2.0 signals, the first and third pairs of differential signal terminals (TX2+−, RX1+−) are omitted, and the second pair of differential signal terminals (D+−) and the second power terminals (PowerNBUS) 32 are retained.

Please refer to FIGS. 4 to 6. In this embodiment, the first receptacle terminals 2 and the second receptacle terminals 3 are respectively disposed at the upper surface 131 and the lower surface 132 of the tongue portion 13. In this embodiment, as shown in FIG. 5 and FIG. 6, the position of the first receptacle terminals 2 corresponds to the position of the second receptacle terminals 3. Additionally, pin-assignments of the first receptacle terminals 2 and the second receptacle terminals 3 are point-symmetrical with a central point of the receptacle cavity 410 as the symmetrical center. In other words, pin-assignments of the first receptacle terminals 2 and the second receptacle terminals 3 have 180 degree symmetrical design with respect to the central point of the receptacle cavity 410 as the symmetrical center. The dual or double orientation design enables an electrical plug connector to be inserted into the waterproof electrical receptacle connector 100 in either of two intuitive orientations, i.e., in either upside-up or upside-down directions. Here, point-symmetry means that after the first receptacle terminals 2 (or the second receptacle terminals 3), are rotated by 180 degrees with the symmetrical center as the rotating center, the first receptacle terminals 2 and the second receptacle terminals 3 are overlapped. That is, the rotated first receptacle terminals 2 are arranged at the position of the original second receptacle terminals 3, and the rotated second receptacle terminals 3 are arranged at the position of the original first receptacle terminals 2. In other words, the first receptacle terminals 2 and the second receptacle terminals 3 are arranged upside down, and the pin assignments of the first flat contact portions 25 are left-right reversal with respect to that of the second flat contact portions 35. An electrical plug connector is inserted into the waterproof electrical receptacle connector 100 with a first orientation where the upper surface 131 is facing up, for transmitting first signals. Conversely, the electrical plug connector is inserted into the waterproof electrical receptacle connector 100 with a second orientation where the upper surface 131 is facing down, for transmitting second signals. Furthermore, the specification for transmitting the first signals is conformed to the specification for transmitting the second signals. Note that, the inserting orientation of the electrical plug connector is not limited by the waterproof electrical receptacle connector 100 according embodiments of the instant disclosure.

Please refer to FIGS. 4 to 6. The metallic shell 41 is a hollowed shell in tubular shaped. The metallic shell 41 is formed by stamping technique or deep drawing technique. The metallic shell 41 is a seamless shell and defines a receiving cavity 410 therein. The metallic shell 41 encloses the base portion 12 and the tongue portion 13 of the insulated housing 11. The metallic shell 41 can be provided for reducing the electromagnetic interference when the first receptacle terminals 2 and the second receptacle terminals 3 are transmitting signals.

Please refer to FIGS. 4 to 6. The metallic shell 41 comprises a tubular portion 43 and an outer peripheral portion 44 integrally formed as a whole. The front of the tubular portion 43 has a front opening 431, and the rear of the outer peripheral portion 44 has a rear opening 441. The outer peripheral portion 44 is formed by deep drawing techniques and extended from the rear of the tubular portion 43. The outer peripheral portion 44 comprises a plurality of bent sections, and the sizes of the bent sections gradually increase from the innermost bent section to the outermost bent section. As shown in FIG. 7B, the outer peripheral portion 44 is approximately formed as horn shaped (i.e., the rear opening 441 of the outer peripheral portion 44 is horn shape), and an inner dimension D1 of the outer peripheral portion 44 is greater than an inner dimension D2 of the tubular portion 43. In this embodiment, the front of the base portion 12 is inserted into the tubular portion 43, and the rear of the base portion 12 is exposed from the outer peripheral portion 44. In other words, the tongue portion 13 is inserted into the metallic shell 41 from the rear opening 441 formed on the outer peripheral portion 44, and the front of the base portion 12 is positioned in the tubular portion 43. In addition, a distance is defined between an inner wall 411 of the outer peripheral portion 44 and an outer surface 12a of the base portion 12. Moreover, a filling groove 45 is defined by the space between the inner wall 411 of the outer peripheral portion 44 and the outer surface 12a of the base portion 12.

In this embodiment, the metallic shell 41 is seamless, which means no cracks are formed at the tubular portion 43 and the outer peripheral portion 44. In other words, the appearances of the tubular portion 43 and the outer peripheral portion 44 are seamless, improving the beauty of the metallic shell 41. In addition, since the metallic shell 41 is a seamless and hollowed shell, making that the structure of the metallic shell 41 be devoid of cracks. Hence, the problem of undesirable shielding effect caused by cracks can be avoided, problems of electromagnetic interference (EMI) and radiofrequency interference (RFI) can be reduced, and problems of poor shielding performance can be further improved. Moreover, since the metallic shell 41 is a seamless structure, the structural strength can be increased, and the metallic shell 41 may be effectively prevented from being deformed by the pushing of an electrical plug connector when the electrical plug connector is mated with the waterproof electrical receptacle connector 100.

Upon processing the metallic shell, at the beginning, a one-piece metallic plate is processed with stamping technique or deep drawing technique to form the hollowed tubular portion 43. And then, with repeated deep drawing or stamping processes, the rear of the tubular portion 43 is formed with the outer peripheral portion 44. In other words, the tubular portion 43 and the outer peripheral portion 44 can be formed by repeated stamping procedures.

Figure 7A:
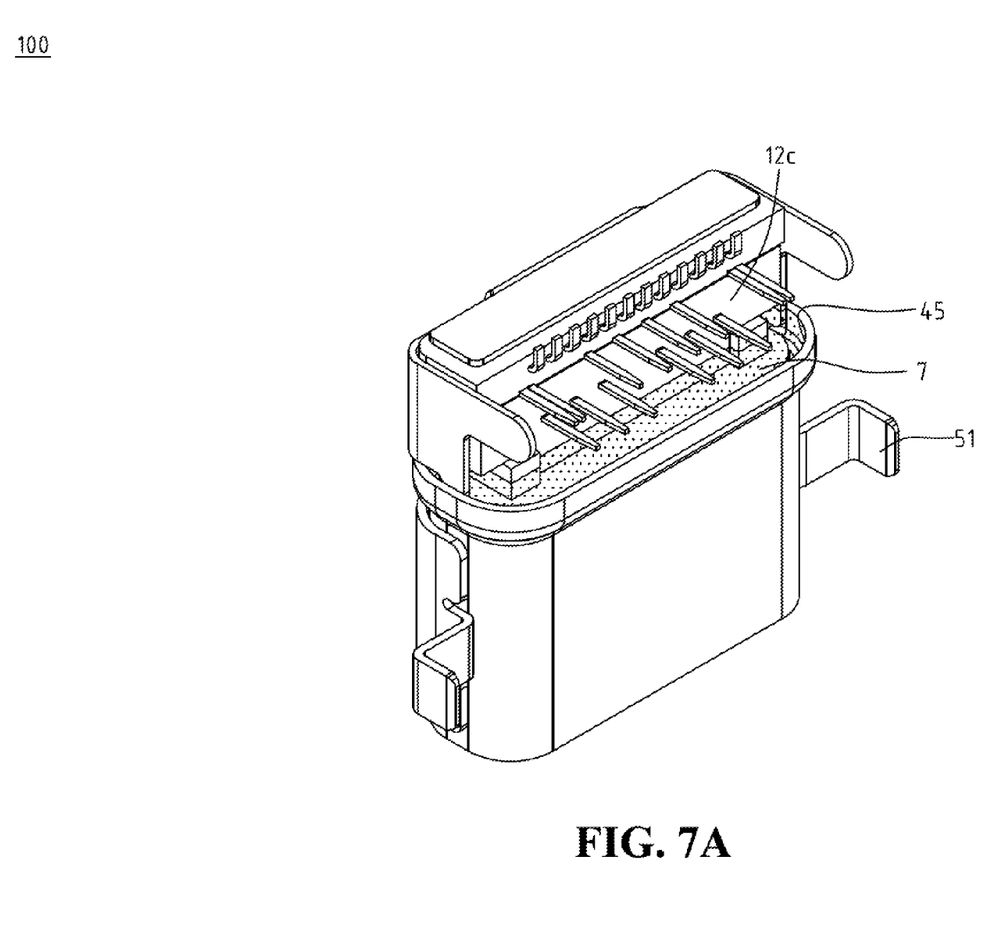
FIG. 7A illustrates a standing perspective view of the waterproof electrical receptacle connector.
Figure 7B:
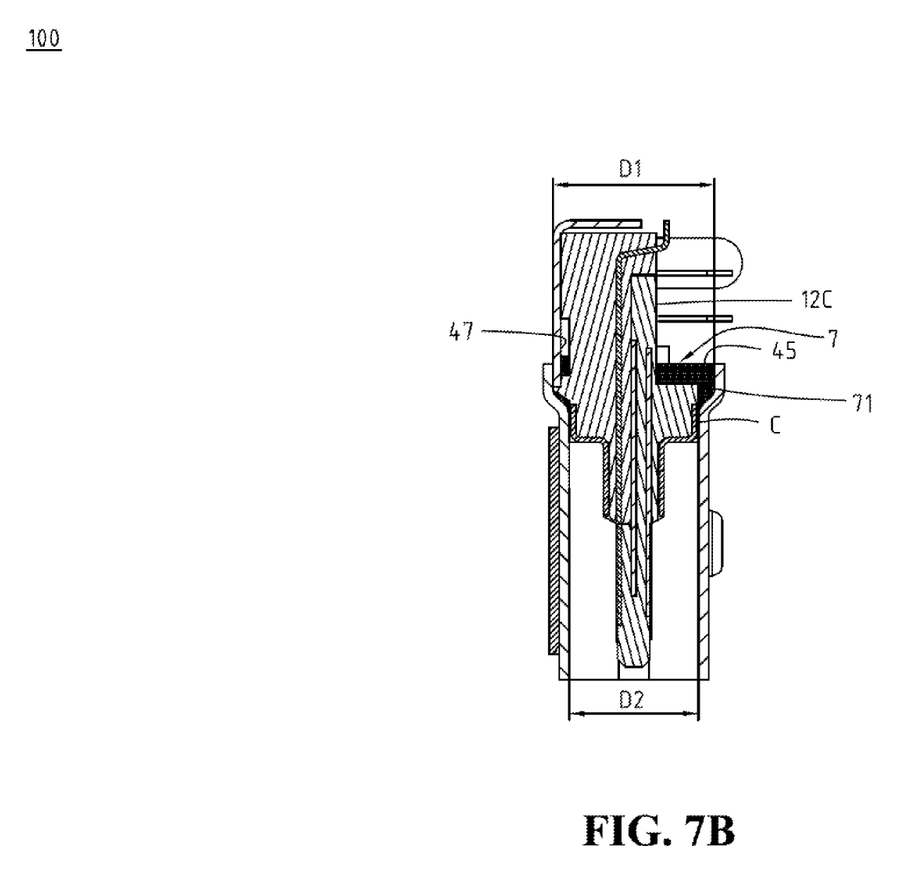
FIG. 7B illustrates a standing sectional view of the waterproof electrical receptacle connector.

Please refer to FIGS. 7A to 7B. The sealing member 7 is a waterproof glue block 71 formed by drying and solidifying a liquid. In this embodiment, before the sealing member 7 is dried and set, the sealing member 7 is filled in the filling groove 45, and it is also filled in the gap C between the inner wall 411 of the outer peripheral portion 44 and the outer surface 12a of the base portion 12. In addition, the sealing member 7 is also filled in the bottom 12c of the base portion 12, i.e., the bottom 12c of the base portion 12 is the portion where the second receptacle terminals 3 are exposed from. That is, the bottom 12c of the base portion 12 is the portion where the second tail portions 36 are exposed from. Therefore, after the sealing member 7 is dried and set, the sealing member 7 can prevent water moist from penetrating into the connector from the receiving cavity 410 of the metallic shell 41, i.e., the sealing member 7 can prevent water moist from being transmitted from the front opening 431 to the rear opening 441. Accordingly, when the waterproof electrical receptacle connector 100 is assembled to an electronic device, water moist cannot enter into the electronic device through the waterproof electrical receptacle connector 100 and would not affect the operation of electronic components on a circuit board of the electronic device.

Please refer to FIGS. 7A and 7B. In this embodiment, a first glue dispensing procedure is applied. In this embodiment, the first sealing section of the sealing member 7 is formed at the filling groove 45. In this embodiment, to perform the first glue dispensing procedure, firstly the waterproof electrical receptacle connector 100 is stood, i.e., the front opening 431 is at the bottom and the rear opening 441 is at the top. Then, the sealing member 7 in liquid state (i.e., uncured sealing member 7) is filled in the bottom 12c of the base portion 12, and the liquid sealing member 7 is further flowed into the filling groove 45, so that the bottom 12c of the base portion 12 and the filling groove 45 are filled by the liquid sealing member 7. After the liquid sealing member 7 is flowed into the filling groove 45, a dry procedure can be applied to the connector, so that the liquid sealing member 7 becomes a solidified waterproof glue block 71 formed at the filling groove 45, and the gap C between the inner wall 411 of the outer peripheral portion 44 and the outer surface 12a of the base portion 12 is filled by the waterproof glue block 71. Therefore, a first level of waterproof function between the inner wall 411 of the outer peripheral portion 44 and the outer surface 12a of the base portion 12 is provided. In addition, after solidification, the sealing member 7 becomes the solidified waterproof glue block 71, thus the sealing member 7 would not be moved freely with respect to the filling groove 45 and prevents the gap C being exposed.

After the first glue dispensing procedure is completed, a second glue dispensing procedure is applied. Please refer to FIGS. 8A to 8C, prior to the second glue dispensing procedure, the back of the waterproof electrical receptacle connector 100 is flipped to the front. In other words, the first tail portions 26 and the second tail portions 36 are upward standing, and the connector is in a laid configuration. And then, the sealing member 7 in liquid state (i.e., uncured sealing member 7) is filled in the bottom 12c of the base portion 12 and the filling section 47 (the structure of the filling section is described in the following paragraphs).

Please refer to FIGS. 1 and 2. In this embodiment, the metallic shell 41 comprises a rear lid 46. The rear lid 46 is approximately formed as upside-down U-shaped. The rear lid 46 is disposed at the rear of the outer peripheral portion 44 and encloses the top and two sides of the base portion 12. In this embodiment, the front end of the rear lid 46 is extended and inserted into the outer peripheral portion 44, so that the rear lid 46 and the outer peripheral portion 44 can be fixed with each other by applying laser soldering techniques to the superposed portions of the rear lid 46 and the outer peripheral portion 44. The rear lid 46 has two legs 463 extended from two sides thereof, and the two legs 463 are adapted to be connected to a circuit board. The rear lid 46 is fixed with the base portion 12 by means of engagement. In this embodiment, the rear lid 46 comprises a plurality of hook portions 461 extended downward, the base portion 12 comprises a plurality of recessed portions 121 at the top of the base portion 12, and each of the hook portions 461 is engaged with the corresponding recessed portion 121, so that the base portion 12 is fixed with the rear lid 46.

Please refer to FIGS. 7A and 7B. In this embodiment, the metallic shell 41 further comprises a filling section 47. The filling section 47 is formed between the inner wall of the rear lid 46 and the outer surface 12a of the base portion 12. In other words, the filling section 47 is the space between the inner wall of the rear lid 46 and the outer surface 12a of the base portion 12. In addition, the filling section 47 is extended from one of two sides of the base portion 12, through the top of the base portion 12, and extended to the other side of the base portion 12. That is, when the rear lid 46 covers on the base portion 12, an upside-down U-shaped filling passage is collectively defined by the rear lid 46 and the base portion 12, and the filling passage is a space defined by the filling section 47 and provided for filling the sealing member 7.

Figure 8A:
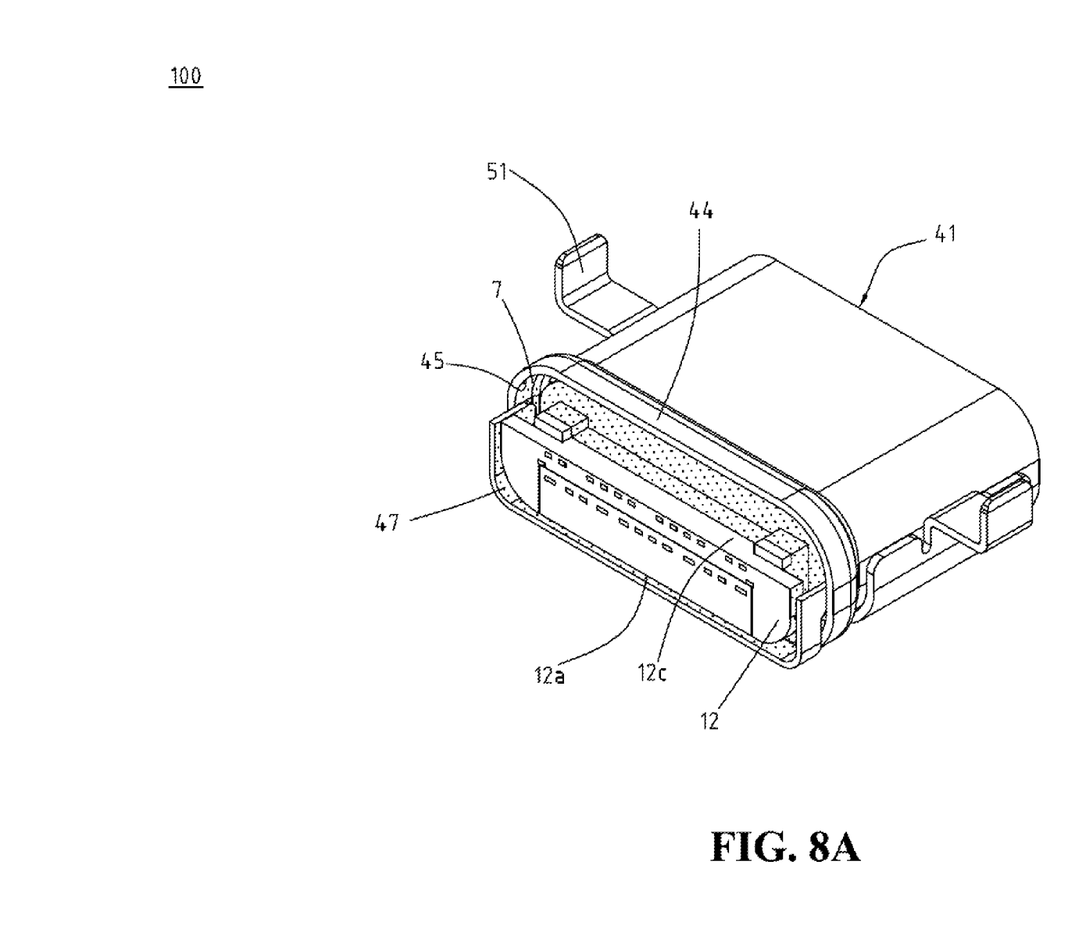
FIG. 8A illustrates a laid sectional view (1) of the waterproof electrical receptacle connector.
Figure 8B:
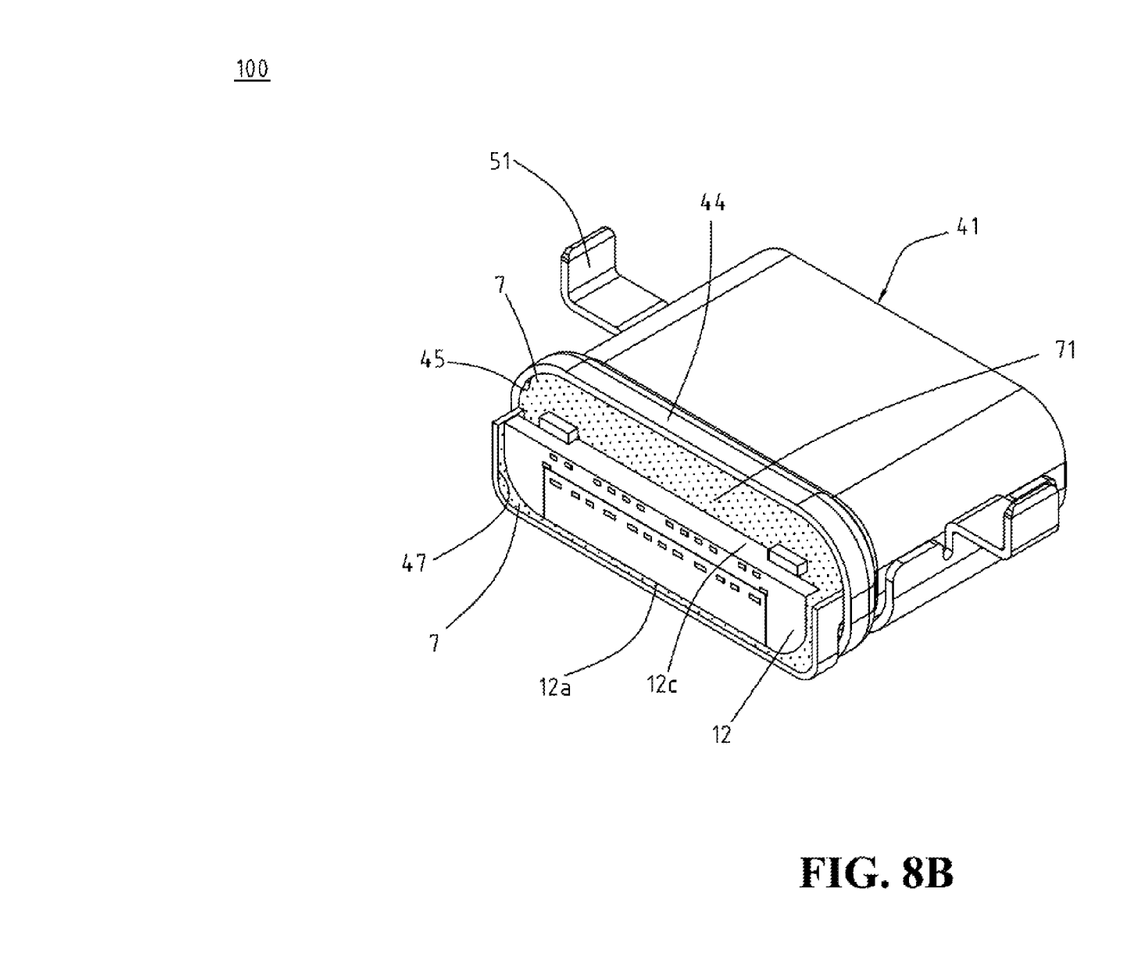
FIG. 8B illustrates a laid sectional view (2) of the waterproof electrical receptacle connector.
Figure 8C:
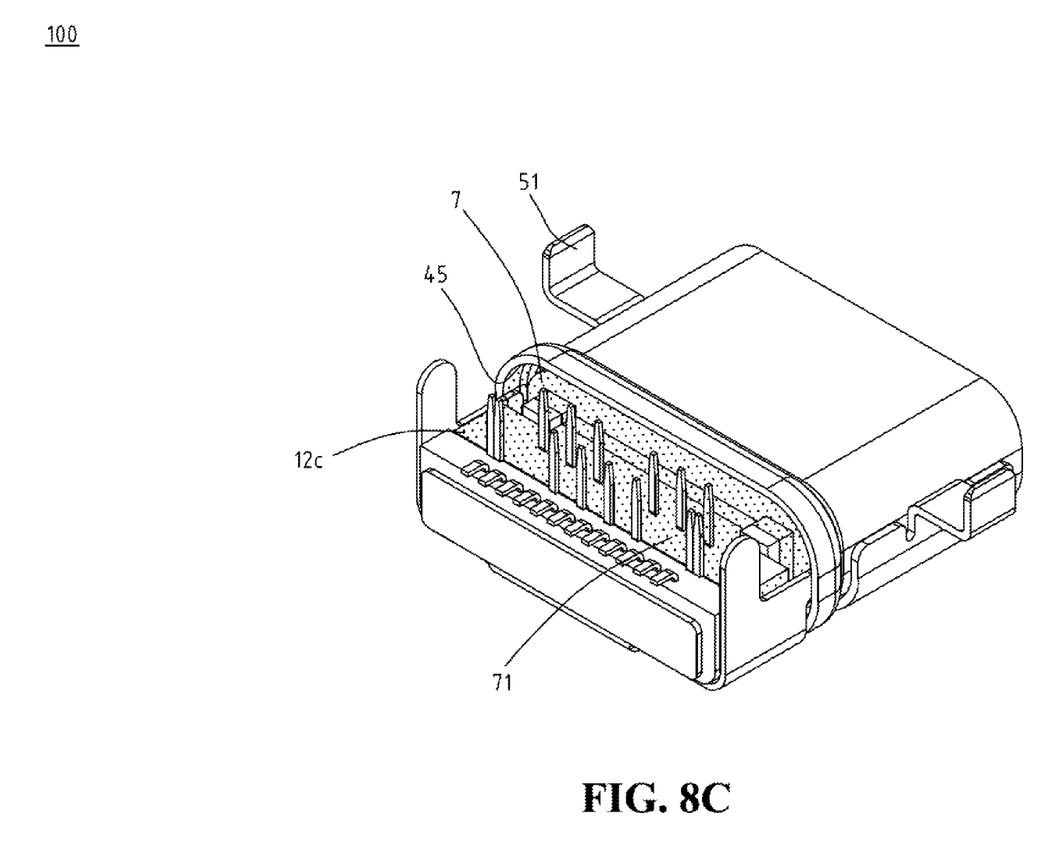
FIG. 8C illustrates a laid perspective view of the waterproof electrical receptacle connector.

Please refer to FIGS. 8A and 8B. In this embodiment, the sealing member 7 is formed at the bottom 12c of the base portion 12 where the second tail portions 36 are exposed. Specifically, the liquid sealing member 7 is flowed to the filling passage defined by the filling section 47 along the bottom 12c of the base portion 12, so that the sealing member 7 fills in the space between the second tail portions 36 and the base portion 12 and fills in the filling section 47. Therefore, a second level of waterproof function is provided between the second tail portions 56 and the base portion 12 and in the filling section 47. In this embodiment, two times of glue dispensing procedures are applied to the connector to achieve the waterproof function, but embodiments are not limited thereto. In some embodiments, three or more times of glue dispensing procedures may be applied to the connector for achieving better waterproof function.

In this embodiment, when the second tail portions 36 are combined with the base portion 12 by means of assembling, the glue dispensing procedures can provide the waterproof function. In other words, the base portion 12 defines a plurality of terminal grooves for assembling the second tail portions 36 respectively. After the second tail portions 36 are assembled to terminal grooves of the base portion 12, a gap may be defined between each of the second tail portions 36 and the corresponding terminal groove. Therefore, the sealing member 7 can be filled into the gaps and prevents water moist from penetrating into the connector through the gap between each of the second tail portions 36 and the corresponding terminal groove.

In the foregoing embodiments, the base portion 12 has the terminal grooves for passing through the second receptacle terminals 3, but embodiments are not limited thereto. Alternatively, according to some embodiments of the waterproof electrical receptacle connector 100, the insulated housing 11 may be integrally formed with the first receptacle terminals 2 and the second receptacle terminals 3. The insulated housing 11, the first receptacle terminals 2, and the second receptacle terminals 3 may be formed integrally by means of insert-molding, over-molding, a combination thereof, or the like. In the embodiment, the insulated housing 11 does not have the terminal grooves, and the first receptacle terminals 2 and the second receptacle terminals 3 are directly passing through the base portion 12. During a thermal procedure of the manufacturing of the waterproof electrical receptacle connector 100, e.g., heating in the flow convection oven, gaps may be formed among the metallic receptacle terminals 2, 3 and the plastic insulated housing 11 because of their different thermal expansion coefficients. Therefore, the waterproof function of the connector is not sufficient then. Thus, the sealing member 7 (e.g. the waterproof glue block 71) may be applied to the waterproof electrical receptacle connector 100, formed at the filling groove 45 and the bottom 12c of the base portion 12, so that the sealing member 7 can be filled into gaps formed in the connector.

Please refer to FIGS. 1 and 2. In this embodiment, the waterproof electrical receptacle connector 100 further comprises an outer shell 5 enclosing the tubular portion 43. The outer shell 5 may be fixed with the tubular portion 43 by applying laser soldering techniques to the superposed portions between the outer shell 5 and the tubular portion 43. The outer shell 5 comprises two legs 51 respectively extended to the two sides of the tubular portion 43. The legs 51 of the outer shell 5 and the legs 463 of the rear lid 46 are both adapted to be assembled with a circuit board. Therefore, the waterproof electrical receptacle connector 100 can be firmly assembled with the circuit board.

In this embodiment, the waterproof electrical receptacle connector 100 further comprises an O-shaped waterproof gasket. The waterproof gasket is fitted over the tubular portion 43. Accordingly, when the waterproof electrical receptacle connector 100 is assembled to a casing of an electronic device, the waterproof gasket 81 is abutted against the inner wall of the casing, so that water moist can be prevented from entering into the casing through the gap between the tubular portion 43 and the casing.

Based on the above, the sealing member (e.g., the waterproof glue block) is formed at the filling groove between the inner wall of the outer peripheral portion of the metallic shell and the outer surface of the base portion, and the sealing member fills the gaps between the inner wall of the outer peripheral portion and the outer surface of the base portion and fills the bottom of the base portion. Accordingly, water moist can be prevented from being entering into the connector. In addition, since the metallic shell is seamless and has no cracks, water moist cannot enter into the connector easily.

Furthermore, the first receptacle terminals and the second receptacle terminals are arranged upside down, and the pin-assignment of the first flat contact portions of the first receptacle terminals is left-right reversal with respect to that of the second flat contact portions of the second receptacle terminals. Accordingly, the waterproof electrical receptacle connector can have a 180 degree symmetrical, dual or double orientation design and pin assignments which enables the waterproof electrical receptacle connector to be mated with a corresponding plug connector in either of two intuitive orientations, i.e. in either upside-up or upside-down directions. Therefore, when an electrical plug connector is inserted into the waterproof electrical receptacle connector with a first orientation, the first flat contact portions of the first receptacle terminals are in contact with upper-row plug terminals of the electrical plug connector. Conversely, when the electrical plug connector is inserted into the waterproof electrical receptacle connector with a second orientation, the second flat contact portions of the second receptacle terminals are in contact with the upper-row plug terminals of the electrical plug connector. Note that, the inserting orientation of the electrical plug connector is not limited by the instant disclosure.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A waterproof electrical receptacle connector, comprising:
   an insulated housing comprising a base portion and a tongue portion extended from one side of the base portion, wherein the tongue portion has an upper surface and a lower surface opposite to the upper surface;
a plurality of first receptacle terminals comprising a plurality of first signal terminals, at least one first power terminal, and at least one first ground terminal, wherein each of the first receptacle terminals is held in the insulated housing and disposed at the upper surface;
a metallic shell defining a receiving cavity for receiving the base portion and the tongue portion, wherein the metallic shell comprises a tubular portion and an outer peripheral portion, the outer peripheral portion is formed by deep drawing techniques and extended from the rear of the tubular portion, wherein an inner dimension of the outer peripheral portion is greater than an inner dimension of the tubular portion, and a filling groove is formed between an inner wall of the outer peripheral portion and an outer surface of the base portion; and
a sealing member formed at the filling groove to fill a gap between the inner wall of the outer peripheral portion and the outer surface of the base portion and to fill a bottom of the base portion.

2. The waterproof electrical receptacle connector according to claim 1, further comprising a plurality of second receptacle terminals, wherein the second receptacle terminals comprise a plurality of second signal terminals, at least one second power terminal, and at least one second ground terminal, wherein each of the second receptacle terminals is held in the insulated housing and disposed at the tongue portion, one of two ends of each of the second receptacle terminals is disposed at the lower surface, and the other end of each of the second receptacle terminals is protruded from the bottom of the base portion.

3. The waterproof electrical receptacle connector according to claim 2, wherein the first receptacle terminals and the second receptacle terminals have 180 degree symmetrical design with respect to a central point of the receiving cavity as the symmetrical center.

4. The waterproof electrical receptacle connector according to claim 2, wherein each of the second receptacle terminals comprises a second flat contact portion, a second body portion, and a second tail portion, wherein the second body portions are held in the base portion and disposed at the lower surface of the tongue portion, each of the second flat contact portions is extended from one of two ends of the corresponding second body portion and disposed at the lower surface of the tongue portion, and each of the second tail portions is extended from the other end of the corresponding second body portion and exposed out of the base portion.

5. The waterproof electrical receptacle connector according to claim 1, wherein the rear of the base is protruded from the outer peripheral portion, the metallic shell comprises a rear lid located at the rear of the outer peripheral portion to enclose the base portion.

6. The waterproof electrical receptacle connector according to claim 5, wherein the metallic shell comprises a filling section formed between the inner wall of the rear lid and the outer surface of the base portion, the filling section is extended from one of two sides of the base portion, through the top of the base portion, and extended to the other side of the base portion, the sealing member is filled in the filling section.

7. The waterproof electrical receptacle connector according to claim 5, wherein the rear lid comprises a plurality of hook portions, the base portion comprises a plurality of recessed portions, each of the hook portions is engaged with the corresponding recessed portion.

8. The waterproof electrical receptacle connector according to claim 1, further comprising an outer shell enclosing the tubular portion, wherein the outer shell comprises two legs respectively extended to two sides of the tubular portion.

9. The waterproof electrical receptacle connector according to claim 1, wherein each of the first receptacle terminals comprises a first flat contact portion, a first body portion, and a first tail portion, wherein the first body portions are held in the base portion and disposed at the upper surface of the tongue portion, each of the first flat contact portions is extended from one of two ends of the corresponding first body portion and disposed at the upper surface of the tongue portion, and each of the first tail portions is extended from the other end of the corresponding first body portion and exposed out of the base portion.

10. The waterproof electrical receptacle connector according to claim 1, further comprising a grounding plate disposed at the insulated housing.

11. A waterproof electrical receptacle connector, comprising:
an insulated housing comprising a base portion and a tongue portion extended from one side of the base portion, wherein the tongue portion has an upper surface and a lower surface opposite to the upper surface;
a plurality of first receptacle terminals comprising a plurality of first signal terminals, at least one first power terminal, and at least one first ground terminal, wherein each of the first receptacle terminals is held in the insulated housing and disposed at the upper surface;
a metallic shell defining a receiving cavity for receiving the base portion and the tongue portion, wherein the metallic shell comprises a tubular portion and an outer peripheral portion, the outer peripheral portion is seamless and extended from the rear of the tubular portion, wherein an inner dimension of the outer peripheral portion is greater than an inner dimension of the tubular portion, and a filling groove is formed between an inner wall of the outer peripheral portion and an outer surface of the base portion; and
a sealing member formed at the filling groove to fill a gap between the inner wall of the outer peripheral portion and the outer surface of the base portion and to fill a bottom of the base portion.

* * * * *